(12) United States Patent
Adachi et al.

(10) Patent No.: US 8,639,507 B2
(45) Date of Patent: Jan. 28, 2014

(54) VOICE RECOGNITION SYSTEM, VOICE RECOGNITION METHOD, AND PROGRAM FOR VOICE RECOGNITION

(75) Inventors: Fumihiro Adachi, Tokyo (JP); Ryosuke Isotani, Tokyo (JP); Ken Hanazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 743 days.

(21) Appl. No.: 12/808,393

(22) PCT Filed: Dec. 22, 2008

(86) PCT No.: PCT/JP2008/073282
§ 371 (c)(1),
(2), (4) Date: Jun. 16, 2010

(87) PCT Pub. No.: WO2009/081895
PCT Pub. Date: Jul. 2, 2009

(65) Prior Publication Data
US 2011/0131043 A1    Jun. 2, 2011

(30) Foreign Application Priority Data
Dec. 25, 2007   (JP) ................................ 2007-332028

(51) Int. Cl.
*G10L 15/00*   (2013.01)

(52) U.S. Cl.
USPC ............ 704/246; 704/247; 704/251; 704/252

(58) Field of Classification Search
USPC .................................. 704/246, 247, 251, 252
See application file for complete search history.

(56) References Cited

U.S. PATENT DOCUMENTS 5,613,037 A * 3/1997 Sukkar .......................... 704/256
5,797,123 A * 8/1998 Chou et al. ................. 704/256.5
(Continued)

FOREIGN PATENT DOCUMENTS

JP          3039634 B2   5/2000
JP      2001-312293 A   11/2001
(Continued)

OTHER PUBLICATIONS

Tomohiro Komura et al., "Consideration of Word Spotting using Garbage Model and Syntactic Restriction", Acoustical Society of Japan, contributed paper for autumn meeting 2-1-17, Oct. 1992, pp. 111-112.

(Continued)

*Primary Examiner* — Leonard Saint Cyr

(57) ABSTRACT

The present invention enables the recognition process at high speed even when a lot of garbage is included in the grammar. The first voice recognition processing unit generates a recognition hypothesis graph which indicates a structure of hypothesis that is derived according to a first grammar together with a score associated with respective connections of a recognition unit by executing a voice recognition process based on the first grammar to a voice feature amount of input voice, and the second voice recognition processing unit outputs the recognition result from a total score of a hypothesis which is derived according to a second grammar after executing a voice recognition process according to the second grammar that is specified to accept a section other than keywords in input voice as the garbage section to a voice feature amount of input voice, and the second voice recognition processing unit acquires the structure and the score of the garbage section from the recognition hypothesis graph.

17 Claims, 7 Drawing Sheets

(56) References Cited

U.S. PATENT DOCUMENTS

| | | | | |
|---|---|---|---|---|
| 7,865,357 | B2* | 1/2011 | Acero et al. | 704/9 |
| 2003/0023437 | A1* | 1/2003 | Fung | 704/236 |

FOREIGN PATENT DOCUMENTS

| | | |
|---|---|---|
| JP | 2002-278584 A | 9/2002 |
| JP | 2003-140685 A | 5/2003 |
| JP | 2004-184716 A | 7/2004 |
| JP | 2009-3205 A | 1/2009 |

OTHER PUBLICATIONS

K. Kano et al., "Voice Recognition System", ed. Information Processing Society of Japan, Ohmsha, Ltd., May 15, 2001, ISBN: 9784274132285, pp. 1-15.

Furui, "Voice Information Processing", Morikita Publishing Co., Ltd., Jun. 1998, ISBN:978-4627702714, pp. 96-114.

International Search Report of PCT Application No. PCT/JP2008/073282 mailed Feb. 17, 2009.

* cited by examiner

Fig.7
(a)
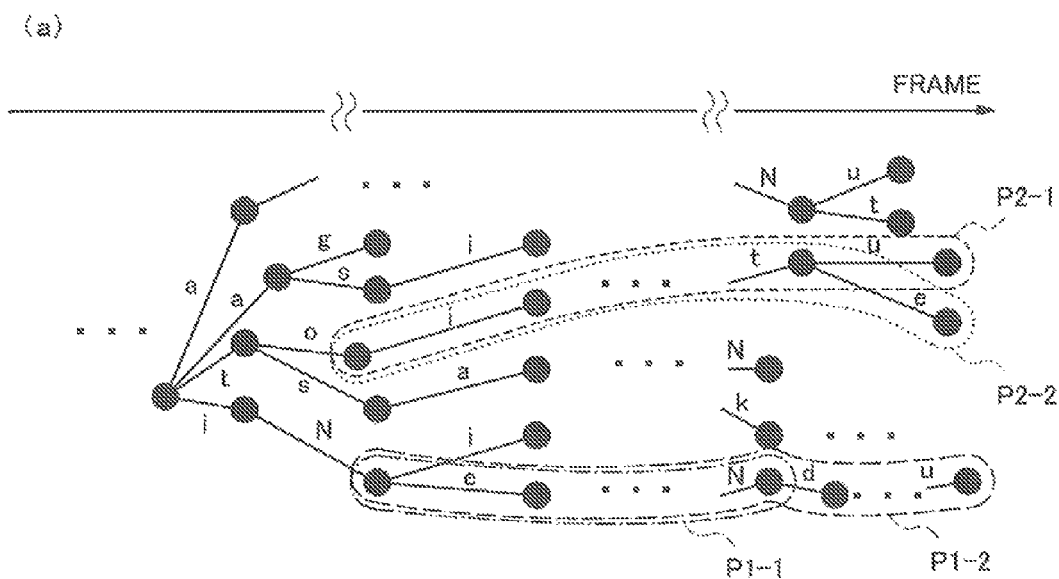
(b)
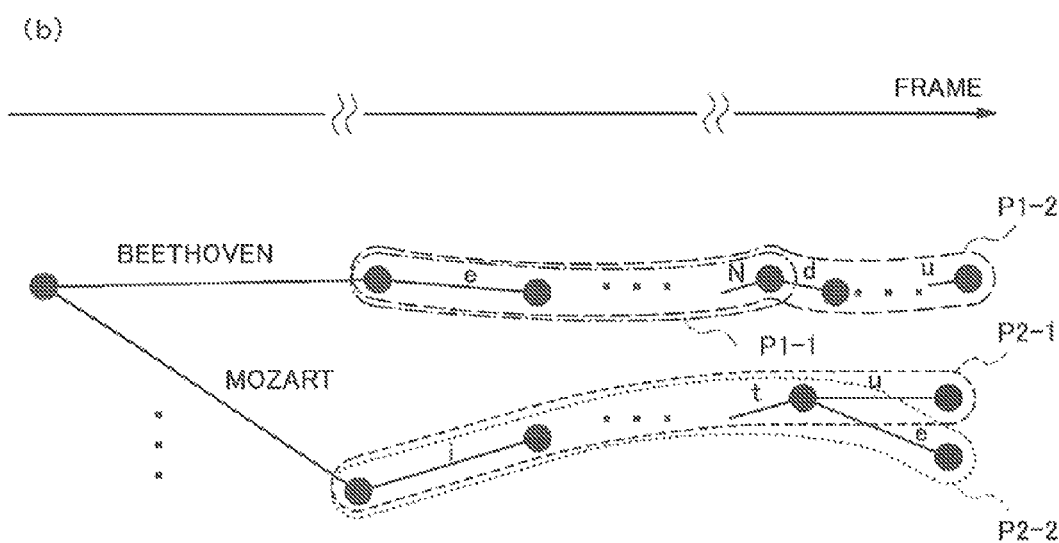

VOICE RECOGNITION SYSTEM, VOICE RECOGNITION METHOD, AND PROGRAM FOR VOICE RECOGNITION

This application is the National Phase of PCT/JP2008/073282, filed Dec. 22, 2008, which claims priority from Japanese Patent Application No. 2007-332028, filed on Dec. 25, 2007, the contents of which are incorporation herein by the reference in their entirety.

TECHNICAL FIELD

The present invention relates to a voice recognition system, a voice recognition method, and a program for voice recognition using a word spotting method.

BACKGROUND ART

In case of speech recognition using a word spotting method which recognizes keywords that are included in input voice, by including a garbage model which accepts optional syllable strings as a garbage in descriptive grammar used for the recognition, it could realize the speech recognition relatively easily without describing all sentence patterns and vocabulary words that have possibility to utter as a vocal sound (refer to a non-patent document 1).

Although how it models the garbage influences significantly on accuracy and speed of the recognition, in order to widen a covering scope, in general, it often uses a dumb model and a model which expresses all Japanese syllables (phoneme) as indicated by the patent document 1.

Patent document 1: Japanese Patent Publication No. 3039634

Non-patent document 1: Tomohiro Konuma and Kazuya Takeda, "Consideration of Word Spotting using Garbage Model and Syntactic Restriction", Acoustical Society of Japan, contributed paper for autumn meeting 2-1-17, pp. 110-111 (1992).

DISCLOSURE OF THE INVENTION

Technical Problem

When it executes a voice recognition process according to a descriptive grammar, in order to prevent loosing grammatical restrictions, it usually handles a search hypothesis separately for vocabulary words that are in a different path and executes a score calculation independently. Similarly, in case of the garbage model in the descriptive grammar, the recognition process executed the garbage in a different path independently (i.e. such as generation of hypothesis and calculation of score). If it models the garbage using all syllable models in order to recognize optional utterance, although the scope that the garbage model covers becomes large, processing amount is increased because the search space is enlarged. For this reason, there was an issue that overall recognition time is increased if more the garbage model was included in the descriptive grammar. Even if it selects a method to reduce the processing amount for each garbage model, this is the remaining essential issue.

The object of the present invention is to provide a voice recognition system, a voice recognition method, and a program for voice recognition, which can execute the recognition process at high speed even when a lot of the garbage is included in the grammar.

Technical Solution

A voice recognition system according to the present invention is a voice recognition system that recognizes keywords included in an input voice, comprising a first voice recognition processing unit that generates a recognition hypothesis graph which indicates a structure of hypothesis that is derived according to a first grammar together with a score associated with respective connections of a recognition unit by executing a voice recognition process based on the first grammar to a voice feature amount of input voice, and a second voice recognition processing unit that outputs a recognition result from a total score of a hypothesis which is derived according to a second grammar after executing a voice recognition process according to the second grammar that is specified to accept a section other than keywords in input voice as the garbage section to a voice feature amount of input voice, and the second voice recognition processing unit acquires a structure and a score of the garbage section from said recognition hypothesis graph.

A voice recognition method according to the present invention is a voice recognition method for recognizing keywords included in input voice, comprises a first step that generates a recognition hypothesis graph which indicates a structure of hypothesis that is derived according to a first grammar together with a score associated with respective connections of a recognition unit by executing a voice recognition process based on the first grammar to a voice feature amount of input voice, and a second step that outputs a recognition result from a total score of a hypothesis which is derived according to a second grammar after executing a voice recognition process according to the second grammar that is specified to accept a section other than keywords in input voice as the garbage section to a voice feature amount of input voice, and acquires the structure and the score of the garbage section from a recognition hypothesis graph in the second step.

A voice recognition program according to the present invention is a voice recognition program for recognizing keywords comprising: execution of a first voice recognition process that recognize input voice according to a first grammar based on a voice feature amount of input voice; execution of a second voice recognition process that recognize input voice according to a second grammar based on a voice feature amount of input voice; generation of a recognition hypothesis graph which indicates a structure of hypothesis that is derived according to the first grammar together with a score associated with respective connections of a recognition unit in a first voice recognition process; and acquisition of the structure and the score of a garbage section of each hypothesis that is derived according to the second grammar from the recognition hypothesis graph in the second voice recognition process.

Advantageous Effects

According to the present invention, because it can omit individual search process of the garbage by commonly using a structure and a score of a recognition hypothesis graph in each garbage section, even when a lot of garbage is included in the grammar (in this case, the second grammar), it can rapidly executes the recognition process.

BEST MODE FOR CARRYING OUT THE INVENTION (NOTE: Considering a feature of the exemplary embodiment of the invention, some Japanese words in Kanji characters, Kana letters and/or roman letters remained beside their English counterparts in the following description. They are, for example, "tsu (ッ)", "Moonlight (gekkoo (月光))", "Beethoven (bectoobeN (ベートーベン))" and the like. The applicant believes that they are helpful to be understood and to expedite its examination, but are not for adding new matters.)

Hereinafter, exemplary embodiments of the present invention will be described with reference to drawings. FIG. 1 is a block diagram showing an exemplary configuration of the voice recognition system according to one of exemplary embodiments of the present invention. The voice recognition system shown in FIG. 1 includes a first voice recognition processing unit 11 and a second voice recognition processing unit 12.

The first voice recognition processing unit 11 executes the voice recognition process according to a first grammar 21 to a voice feature amount of input voice. Then, it generates a recognition hypothesis graph which indicates the structure of hypothesis that is derived according to the first grammar 21 by the voice recognition process, with a score associated with respective connections of recognition units. For example, the first voice recognition processing unit 11 may generate information in a graph format as the recognition hypothesis graph, which expressed a result of searched strong likelihood word sequence or the like according to input voice processed by the voice recognition process according to the first grammar 21. The recognition hypothesis graph may include a structural information (i.e. information such as what node there is in which frame or how nodes are connected (i.e. what are there is) respectively) and information on the score among each node, and information may expressed by a network format or a trellis format as an example. In addition, the first grammar 21 that can be applied to the first voice recognition processing unit 11 may accept any kind of grammar under a condition that the grammar accepts the garbage. For example, a grammar, which is specified to accept input voice as the optional chain of phoneme, phoneme string, syllable, syllabic string, vocabulary word, and word sequence, is applicable.

The second voice recognition processing unit 12 executes the voice recognition process according to a second grammar 22 that is specified to accept sections other than keywords in input voice as a garbage section to the voice feature amount of input voice. Then, it outputs the recognition result from a total score of the hypothesis that is derived according to the second grammar 22 by the voice recognition process. Further, when it is building (generating) the hypothesis during a solution search process in the voice recognition process, the second voice recognition processing unit 12 in the present invention acquires the structure and the score of the garbage section of each hypothesis from the recognition hypothesis graph which the first voice recognition processing unit 11 generated.

As an example, the second voice recognition processing unit 12 may extend the hypothesis to the hypothesis which reached the garbage section in the second grammar 22, by selecting no smaller than one voice section having a node which can connected with the hypothesis as a starting point in the recognition hypothesis graph and by connecting the structure and the score of the selected voice section as a structure and score of the garbage section with the hypothesis. In that case, for a language of input voice, it may select a voice section which has a node that can be the vocabulary word termination as an ending point.

Hereinafter, it will describe using a more concrete exemplary configurations. FIG. 2 is the block diagram showing a more concrete exemplary configuration of the voice recognition system according to one of exemplary embodiments of the present invention. As shown in FIG. 2, the voice recognition system according to the exemplary embodiment includes a voice analysis unit 100 and a voice recognition unit 200.

Here, in the exemplary embodiment, search hypothesis means a derived hypothesis by a solution search process of the voice recognition process. Further, the hypothesis in the voice recognition process means a route (path) in the syndetic structure which connects with the substance (phoneme etc.) of the recognition unit along the grammar, which is derived as a candidate of the recognition result.

The voice analysis unit 100 converts input voice into a voice feature amount at a prefixed interval (hereinafter, the frame).

The voice recognition unit 200 recognizes input voice based on the voice feature amount which the voice analysis unit 100 converted. The voice recognition unit 200 includes a recognition hypothesis graph generation unit 201, a hypothesis search unit 202, a first grammar storage unit 211, and a second grammar storage unit 212.

The recognition hypothesis graph generation unit 201 executes a voice recognition process according to a first grammar that is indicated by information stored in the first grammar storage unit 211 and outputs a recognition hypothesis graph. Here, the recognition hypothesis graph generation unit 201 is a processing unit corresponding to the first voice recognition processing unit 11 that is shown in FIG. 1. Further, the recognition hypothesis graph, which the recognition hypothesis graph generation unit 201 outputs, does not have to show information on all the generated search hypotheses. For example, it is possible to output the recognition hypothesis graph showing only information on the search hypothesis where the score (accumulated score associated with respective connections among each recognition unit) of search hypothesis is no smaller than the predetermined value.

The hypothesis search unit 202 executes the voice recognition process according to the second grammar that is indicated by information stored in the second grammar storage unit 212, recognizes (generates) the search hypothesis, and outputs a recognition result from the search hypothesis. Further, the hypothesis search unit 202 is a processing unit corresponding to the second voice recognition processing unit 12 as shown in FIG. 1.

The First grammar storage unit 211 stores information which indicates the first grammar. For example, the first grammar storage unit 211 stores information which described the sentence expression that the first grammar accepts in a format of the network grammar. Further, the grammar for speech recognition may indicate definitions of phrase and relationship among phrases; therefore, it may include information expressed by a CFG grammar (context free grammar) and a normal grammar besides a format of network grammar. Specifically, it may use a method such as expression using an infinite loop of the optional phoneme as shown in FIG. 3.

FIG. 3 is an explanation drawing showing an example of definition of the first grammar. Further, although FIG. 3 indicates an example using monophone (single phoneme model) as a unit, it is also possible to use triphone (trio phoneme model), syllables, and vocabulary words. As shown in FIG. 3, by connecting all phonemes which can be vocalized in input voice by the infinite loop, it can define a grammar which accepts the optional phoneme string.

The second grammar storage unit 212 stores information indicating the second grammar. For example, the second grammar storage unit 212 stores a sentence expression which the second grammar accepts as information described by the format of the network grammar. Further, the second grammar may define a section other than the keyword specified by a task as the garbage section. Specifically, it may use a method such as defining a special vocabulary word <Garbage> indicating that it is the garbage section as shown in FIG. 4.

Further, the keyword here does not need to use the vocabulary word as a unit, and it may use any word and phrase that is specified by the task such as optional phoneme string, syllable string and the like.

FIG. 4 is an explanation drawing showing an example of definition of the second grammar. Further, in an example shown in FIG. 4, although it indicates an example which defines the vocabulary word such as "Beethoven" and "Moonlight" as a unit, it can also define the syllable and the phoneme as a unit. As shown in FIG. 4, by inserting a special vocabulary word <Garbage> in a part where the phoneme string other than the keyword can be vocalized, it can define the grammar which accepts the section other than the keyword as the garbage section. Further, because it can accept the optional word and phrase (such as vocabulary word, syllable, and phoneme string) without describing all words and phrases with vocalized possibility by defining the language model (i.e. descriptive grammar) including these garbage, it can accept input having various patterns such as "I want to listen a music composed by Beethoven", "which Hero is composed by Beethoven", and "Beethoven composed a Hero", as shown in the example of FIG. 4.

Next, a behavior of the exemplary embodiment will be described. FIG. 5 is a flowchart showing an example of behavior of the voice recognition system of the exemplary embodiment. As shown in FIG. 5, when a user inputs voice to the voice recognition system (Step S1), the voice analysis unit 100 converts the inputted voice into the voice feature amount (Step S2).

Next, by executing the voice recognition process of the voice feature amount according to the first grammar indicated by information stored in the first storage unit 211, the recognition hypothesis graph generation unit 201 generates the recognition hypothesis graph (Step S3).

When the recognition hypothesis graph is generated by the recognition hypothesis graph generation unit 201, the hypothesis search unit 202 generates the search hypothesis by executing voice recognition process of the voice feature amount according to the second grammar that is indicated by information stored in the second grammar storage unit 212 and derives (generates) the search hypothesis by utilizing the structure and the score of the recognition hypothesis graph that is created by the recognition hypothesis graph generation unit 201 (Step S4). Finally, it outputs the best path of the score from the search hypothesis as the recognition result (Step S5).

Hereinafter, it will show a more concrete example and describe a behavior of the exemplary embodiment. In this case, in order to execute the speech recognition of input voice which says "I want to hear a Hero composed by Beethoven"; it considers voice recognition process using a descriptive grammar that is shown in FIG. 4 as the second grammar. It is supposed that the task will be achieved if two keywords (i.e. name of the composer and the title of the music) can be recognized. In order to accept the utterance other than the keywords, it absorbs variations of various utterances by including the <Garbage> in the grammar.

First, the voice analysis unit 100 converts input voice into the voice feature amount at prefixed interval (i.e. frame). And then, it inputs the converted voice feature amount to the recognition hypothesis graph generation unit 201 and the hypothesis search unit 202. For example, by extracting the feature amount vector from the inputted voice waveform by the short time frequency analysis, the voice analysis unit 100 may calculate MFCC (Mel-Frequency Cepstrum Coefficient) as the feature amount. Further, a converting method of voice into the voice feature amount is disclosed in a document 2: KANO and others: "Voice Recognition System", ed. Information Processing Society of Japan, pp. 1-15, Ohmsha, Ltd. (2001), as an example.

Next, the recognition hypothesis graph generation unit 201 executes the voice recognition process using the voice feature amount that is outputted from the voice analysis unit 100. The recognition hypothesis graph generation unit 201 may execute a frame synchronization continuous voice recognition process according to the first grammar. It uses the first grammar which is designed so as to accept a garbage part of vocalization. In the exemplary embodiment, although it describes a case when a grammar that accepts the optional syllable string is applied, in addition, it may use a grammar which accepts a chain of prefixed phonemes, syllables, and the vocabulary word, and it is possible to add limits on the chain or introduces a chain probability. Further, as for the unit of phrase in the first grammar, it may use those that are defined in advance independent from the second grammar or it may use those that are defined according to the second grammar. For example, it is possible to use the vocabulary word as the unit for the second grammar and to use the phoneme as the unit for the first grammar which is different from the second grammar.

As a method of the voice recognition process, as an example, it may use a probability model of a feature vector sequence based on commonly used HMM (Hidden Markov Model). The recognition hypothesis graph generation unit 201, as an example, uses a probability model based on the HMM as the voice recognition process, and calculates likelihoods based on a transition probability or a output probability of the status correlated to each element in the predetermined model unit (such as monophone and triphone). Further, a concrete method of the speech recognition method based on HMM is disclosed in a document 3: FURUI, "Voice Information Processing", pp. 96-114, Morikita Publishing Co., Ltd. (1998), as an example. In the exemplary embodiment, because the recognition is executed according to the first grammar, the hypothesis mainly based on the phoneme unit is created, and the recognition hypothesis graph showing structure of the hypothesis (connection relationship of phoneme that is the recognition unit) and each score (likelihood) associated with respective connections is generated.

Further, the hypothesis search unit 202 executes the voice recognition process using the voice feature amount which the voice analysis unit 100 converted. Furthermore, a method of the voice recognition process may be similar to that of the recognition hypothesis graph generation unit 201. In this example, because it will be executing the voice recognition process according to an example of the descriptive grammar which is shown in FIG. 4, the hypothesis search unit 202 executes a process corresponding to the keyword section such as "Beethoven" and "Schubert" or the like at first, and then derives the search hypothesis. Here, it is supposed that the search hypothesis of "n (ン)" in the tone of "Beethoven (ベートーベン))" reached the vocabulary word termination at the m-th frame. According to the method based on above-mentioned HMM, the hypothesis score (i.e. accumulated score from the start frame) of the m+1-th frame will be calculated as the tone of "n (ン)" by own loop, or the hypothesis score is calculated as a start tone of the next <Garbage> area by a state transition. In the present invention, the hypothesis search unit 202 executes the voice recognition process according to the descriptive grammar, and uses different generation method (i.e. search method) between the keyword section and the garbage section.

The hypothesis search unit 202 uses the above-mentioned method of searching a connection destination path of the node by the score calculation for each frame based on HMM as a search method of the keyword section. On the other hand, as a search method of the garbage section, it adapts a method of using the structure and the score of the recognition hypothesis graph created in advance by the recognition hypothesis graph generation unit 201 and commonly utilizes those in each garbage section, instead of using the above-mentioned method of executing score calculation on every frame based on HMM. In other words, the hypothesis search unit 202 copies the section of the recognition hypothesis graph and extends the search hypothesis to each search hypothesis that reached the garbage section. In a normal method, the score calculation and collation process was executed respectively at each garbage section. By using the method described by the present invention, score calculation and collation process can be done only once at the time of creating the recognition hypothesis graph. Therefore, execution time is reduced greatly in particular for a case when the <Garbage> is included in a plurality of paths as shown in FIG. 4.

As is described above, the recognition hypothesis graph is usually needed to be generated in advance in order to execute the search process of the garbage section. However, it is also possible to execute the recognition hypothesis graph generation process by the recognition hypothesis graph generation unit 201 and the search hypothesis generation process by the hypothesis search unit 202 in parallel, and to get a section as the garbage section among the recognition hypothesis graph which was generated chronically later from the hypothesis which reached the garbage section.

The following describes a case when it employs triphone as the recognition unit and outputs the graph of triphone as the recognition hypothesis graph. However, it is possible to use anything that has a possibility to use as the recognition unit of the usual voice recognition process such as the syllable, diphone, monophone, and others. And it can consider various information that is generated as the recognition hypothesis graph such as a phoneme graph and a syllable graph according to the description of the first grammar and the recognition unit. In addition, regarding the generation the voice recognition process according to the first grammar, it can consider a method of generating the recognition hypothesis graph by processing input voice in the same direction with time direction and also by processing in a reverse direction against time direction.

For example, the recognition hypothesis graph generation unit 201 executes continuous speech recognition in a reverse direction against time direction of input voice according to the first grammar and generates the recognition hypothesis graph with the tree structure which uses triphone as a unit. FIG. 6 shows an example of a generated graph. FIG. 6 is the explanation drawing showing an example of the recognition hypothesis graph which uses triphone as the recognition unit. Because it executes reverse process in terms of time, right side (late in terms of time) of the graph is a root, and left side (early in terms of time) is a leaf. In other words, because the recognition process is executing from the right direction in the drawing, a parent node of a node-A is a node-B. In addition, the parent node of the node-B is a node-C. For example, FIG. 6 indicates that a search starts from next to frame of time n+N (node-B) for finding triphone "N−g+a" which follows triphone "g−a+e" and reaches ending point at the time n+2 (node-A"), n+1 (node-A'), n (node-A), and so on. Further, for example, the accumulated score at the continuous voice recognition process is attached to each node. This score may be an accumulated score from the root node, an accumulated score from the parent node, or an accumulated score from the optional ancestor node. Further, in an example shown in FIG.

6, although the example indicates a syndetic structure of the recognition hypothesis graph expressed as a tree structure, the expression format of the syndetic structure is not only limited to the tree structure. For example, the expression format of the syndetic structure may be the above mentioned network format or the trellis format.

When the vocabulary word termination of the keyword "Beethoven" reaches the n-th frame in a certain hypothesis, the hypothesis search unit 202 can connect with the node-A' as the hypothesis of the next frame following to the above-mentioned example. In addition, when it searches the garbage section, because it is possible to automatically trace back (A' to B to C, etc.) the parent nodes in turn on the recognition hypothesis graph if the starting point of the node is decided, the hypothesis search unit 202 can immediately extend the search hypothesis to beyond the current frame without executing score calculation for all the frames. Accordingly, it is possible to handle each extended node as the vocabulary word termination, in other words the ending point of the garbage section.

Further, if the nodes that can be the vocabulary word termination in the language of input voice are limited, the hypothesis search unit 202 may selects as objects only the nodes that can be the vocabulary word termination. For example, in a case of Japanese, it is supposed that it will limit the node which can be the vocabulary word termination to the nodes correlated to the vowel and the phoneme of "n (ん)"", and it may exclude the section having the selected node as the ending point from the selected objects considering that other phonemes are not the vocabulary word termination. In an example shown in FIG. 6, the node-B can be excluded from the selected objects. As the score for extending the search hypothesis by connecting the selected section, it uses the accumulated score given to each node of the recognition hypothesis graph. For example, when it extends the search hypothesis from the node-A' to the node-C, it can easily calculate the score between node-A' and node-C by subtracting an accumulated score given to the node-C from an accumulated score given to the node-A'. This calculation method varies depending on which node the accumulated score from is given. And it is quite easy in any case. Further, in case of Japanese, an example where the node correlated to the phoneme besides the vowel and the phoneme of "n (ん)" " is excluded is an example, it is not limited to this example and it can exclude based on the other conditions. For example, in addition to the node which can be the vocabulary word termination, it can consider a conditioning to include in addition a node which could be correlated to the syllable "tsu (つ)".". The hypothesis search unit 202 may decide whether the node can be the vocabulary word termination or not based on the condition that is designated by administrators who specified the second grammar.

In addition, although it has selected a starting node considering a phoneme context of triphone in the above-mentioned example when deciding the garbage section from the recognition hypothesis graph, all nodes that exist in the frame can be the starting node if there are no contexts like monophone.

Further, the score in the recognition hypothesis graph is not only limited to the accumulated score that was given to the node as mentioned above, but also the score may be given so as to calculate the score when trace back between the optional nodes such as the score of the section is given to the are which ties between two nodes. Furthermore, in order to prevent that the keyword part in input voice is absorbed by the garbage, it may add the fixed penalty or a penalty according to the duration length or the number of syllables or the like to the score of the garbage section.

Here, when it uses the node-C as the vocabulary word termination, because connectable keywords will be "Moonlight (gekkoo (月光))" or "Hero (eeyuu (英雄))" according to an example of the descriptive grammar shown in FIG. 4, it executes again the voice recognition process from the section as the search of the keyword section and extends the search hypothesis. Further, although it has described using triphone, it can use a right phoneme environment in this case, and it can set "Hero (eeyuu (英雄))" that starts with "e" as the object of a real execution in case of the node-C (i.e. connection destination node of triphone "g–a+e").

Finally, it derives the most likelihood keyword series to input voice from total score (total score from the start frame to the end frame) of each hypothesis that is recognized (generated) by the hypothesis search unit 202 according to the second grammar, and outputs as the recognition result.

As is described above, by searching the garbage section and the keyword section by a different method, because it docs not need to execute the score calculation independently at each garbage section (in other words, it may copy the score of the recognition hypothesis graph as it is) while covering the various utterance variations, it can realize high speed processing.

Further, in the above-mentioned description, it has described a method of applying the creation method of the recognition hypothesis graph by executing the speech recognition in a reverse direction from time direction of input voice, basic method is similar even though the method to execute the continuous speech recognition and to create the recognition hypothesis graph in the same direction as time direction of input voice. However, when executing the continuous speech recognition in the same direction and generating the recognition hypothesis graph, a number that can be outputted from the vocabulary word termination of the garbage section is different. In other words, because the parent node is single for each node of the recognition hypothesis graph of the tree structure in case of the opposite direction, when a certain node was selected as a start of the hypothesis, the hypothetic terminal corresponding to the garbage section was automatically decided to one. On the other hand, in case of the same direction, because start node of the hypothesis becomes the parent node and the terminal node becomes a descendant node, plurality of vocabulary word termination may exist. In such a case, it can build as no smaller than one new hypothesis by connecting each section of the vocabulary word termination with the hypothesis which reached the garbage section.

Further, it can execute the graph generation in parallel with the voice recognition process according to the descriptive grammar in case of the same direction in terms of time. Moreover, even if the recognition hypothesis graph will be a complicated graph like the network structure instead of the tree structure, it can apply without changing a basic configuration except for increase of number of available nodes. Because it will generate the recognition hypothesis graph prior to the voice recognition process when it executes the recognition hypothesis graph generation process in a reverse direction, it becomes available to use the recognition hypothesis graph as the anticipated result when executing the voice recognition process, and improvement of accuracy of the recognition and the effect of speedy processing by reducing search space at the time of the voice recognition process are achieved. On the other hand, when it executes the recognition hypothesis graph generation process in the same direction, because it can execute the recognition hypothesis graph generation process and the voice recognition process in parallel which is different from the case in the opposite direction, effect of the speedy processing is achieved.

FIG. 7 is an explanation diagram showing an example of copy of the garbage section. Here, FIG. 7 (a) indicates an example of the recognition hypothesis graph which used monophone as the recognition unit. In addition, FIG. 7 (b) indicates an example where it expressed the search hypothesis by a graph format. By executing the voice recognition process of input voice according to the first grammar, for example, the recognition hypothesis graph generation unit 201 generates the graph of the phoneme as shown in FIG. 7 (a) as the recognition hypothesis graph. On the other hand, by executing the voice recognition process of input voice according to the second grammar, the hypothesis search unit 202 generates the search hypothesis which is expressed mainly by the graph of the vocabulary word as shown in FIG. 7 (b) as an example. To the keyword section, the hypothesis search unit 202 executes the voice recognition process according to the phoneme string of Beethoven (beetoobeN (ベートーベン))" and Hero (eeyuu (英雄))" or the like that are defined specifically in the second grammar. On the other hand, to the garbage section which the phoneme string is not defined specifically, it copies the appropriate section from the recognition hypothesis graph which the recognition hypothesis graph generation unit 201 generated and uses as the part of the search hypothesis.

In an example shown in FIG. 7, by connecting the hypothesis which reached the vocabulary word termination of the keyword "Beethoven (bectoobeN (ベートーベン))" (i.e. hypothesis that reached the garbage section) in the second grammar with structure (and the score) of path (the section) P1-1 and P1-2 starting from a node (in this case, the node following the phoneme 'N' located in the same frame in the recognition hypothesis graph) which is connectable with a node that becomes the vocabulary word termination (i.e. the phoneme 'N') of the hypothesis in the recognition hypothesis graph as the garbage section, it is extending the hypothesis. In addition, for example, it is extending the hypothesis by connecting the hypothesis which reached vocabulary word termination (i.e. phoneme 'o') of the keyword "Mozart (mootsuaruto (モーツァルト))" with the structure (and the score) of path P2-1 and P2-2 starting from a node that follows the phoneme 'o' located in the same frame of the recognition hypothesis graph as the garbage section, it is extending the hypothesis. Further, in an example shown in FIG. 7, although it indicates an example where two sections are selected as the garbage section for connecting to one starting node, it does not limit number of the selected section to two. For example, it can select all sections which have a node that can be the vocabulary word termination as an ending point.

Furthermore, concerning a direction of the voice recognition process of the hypothesis search unit 202, it is also possible to execute in a reverse direction with time direction of input voice. For example, it is possible to consider a configuration where it synchronizes the execution in the recognition hypothesis graph generation unit 201 with input voice to the forward direction (same direction) and generates the recognition hypothesis graph at first, and then the hypothesis search unit 202 executes the hypothesis search process in a reverse direction as time direction of input voice after voice input has completed. In this case, as it is mentioned above, the recognition hypothesis graph becomes available as the result of anticipation, improvement of the accuracy of recognition and the effect of the speedy execution by the reduction of search space at the time of the voice recognition process are achieved.

As it has been described above, a grammar can be used as the first grammar, which is defined in advance such as the grammar that accepts the optional syllabic string, independent from the second grammar. In this case, it can generate the recognition hypothesis graph speedy by expanding the first grammar to the network based on the recognition unit such as triphone in advance and introducing the exclusive process specialized for a search in advance in the recognition hypothesis graph generation unit 201.

While the exemplary embodiment of the invention has been described with reference to the drawings, the specific composition of the invention is not limited to this embodiment. Various changes to the configurations may be made within the spirit and scope of the present invention.

For example, it can carry out the control behavior in the exemplary embodiment mentioned above by hardware, software, or the compounded composition of them. Further, when executing it by software, it can install a program, in which an execution sequence was recorded, on a memory of a computer which is built-in in an exclusive hardware and carrying out, or install and execute the program on a general-purpose computer which can carry out various processes.

For example, it can record the program in a recording medium such as a hard disk or a ROM (Read Only Memory) in advance.

Further, the program can be stored (recorded) temporarily or permanently on a removable recording medium such as: Floppy Disks (trademark), CD-ROMs (Compact Disc Read Only Memory), MO (Magneto optical) disks, DVDs (Digital Versatile Disc), magnetic disks, and semiconductor memories.

It is possible that this kind of removable recording medium is served as so-called packaged software.

Further, in addition to be installed on the computer from the removable recording media as mentioned above, the program can be transferred through wireless transmission and wired transmission to the computer via networks such as the LAN (Local Area Network) and Internet from download sites, and then the computer installs the transmitted program on a recording medium such as built-in hard disk.

Moreover, the process behavior described in the above-mentioned embodiment can be configured for being carried out chronologically, separately, or in parallel according to the processing capability of the apparatus or if it is needed.

Furthermore, the system described in the above-mentioned embodiment can be configured such as plurality of apparatus are logical assembled or functions of respective apparatus are intermingled.

Further, the above-mentioned embodiment describes a configuration of the voice recognition system which including the first voice recognition processing unit (ex. first voice recognition processing unit 11) that generates the recognition hypothesis graph which indicates the structure of hypothesis that is derived according to the first grammar together with the score associated with respective connections of the recognition unit by executing the voice recognition process based on the first grammar to the voice feature amount of input voice, and the second voice recognition processing unit (ex. second voice recognition processing unit 12) that outputs the recognition result from the total score of the hypothesis which is derived according to the second grammar after executing the voice recognition process according to the second grammar that is specified to accept a section other than keywords in input voice as the garbage section to the voice feature amount of input voice, and the second voice recognition processing unit acquires the structure and the score of the garbage section from the recognition hypothesis graph.

Further, the above-mentioned embodiment describes a composition of the voice recognition system using a specified grammar that may accept an optional chain of one of a phoneme, a phoneme string, a syllable string, a word and a word sequence as the first grammar.

Further, the above-mentioned embodiment describes the composition of said voice recognition system wherein the second voice recognition processing unit, to the hypothesis reached to the garbage section in the second grammar, selects no smaller than one voice section having a node which can connected with the hypothesis as a starting point in the recognition hypothesis graph, and connects the structure and the score of the selected voice section with the hypothesis as the structure and the score of the garbage section.

Further, the above-mentioned embodiment describes the composition of said voice recognition system wherein the second voice recognition processing unit selects a voice section having a node which can be the vocabulary word termination as a ending point in the language of input voice, when selecting the voice section which is connected with the hypothesis that reached the garbage section in the recognition hypothesis graph.

Further, the above-mentioned embodiment describes the composition of said voice recognition system wherein the first voice recognition processing unit executes the voice recognition process in the same direction with time direction of input voice.

Further, the above-mentioned embodiment describes the composition of said voice recognition system wherein the first voice recognition processing unit executes the voice recognition process in a reverse direction with time direction of input voice.

Further, the above-mentioned embodiment describes the composition of said voice recognition system wherein the second voice recognition processing unit executes the voice recognition process in a reverse direction with time direction of input voice.

Further, the above-mentioned embodiment describes the composition of the voice recognition system wherein the second voice recognition processing unit executes the voice recognition process in the same direction with time direction of input voice.

THE AVAILABILITY ON THE INDUSTRY

The present invention is suitably applicable to cases where it recognizes input voice according to the grammar that includes garbage models.

This application claims priority from Japanese Patent Application No. 2007-332028, filed on Dec. 25, 2007, the contents of which are incorporation herein by the reference in their entirety.

BRIEF DESCRIPTION OF THE DRAWINGS

FIG. 7 is an explanation drawing showing an example of a copy of a garbage section.

EXPLANATION OF REFERENCE

Figure 1:
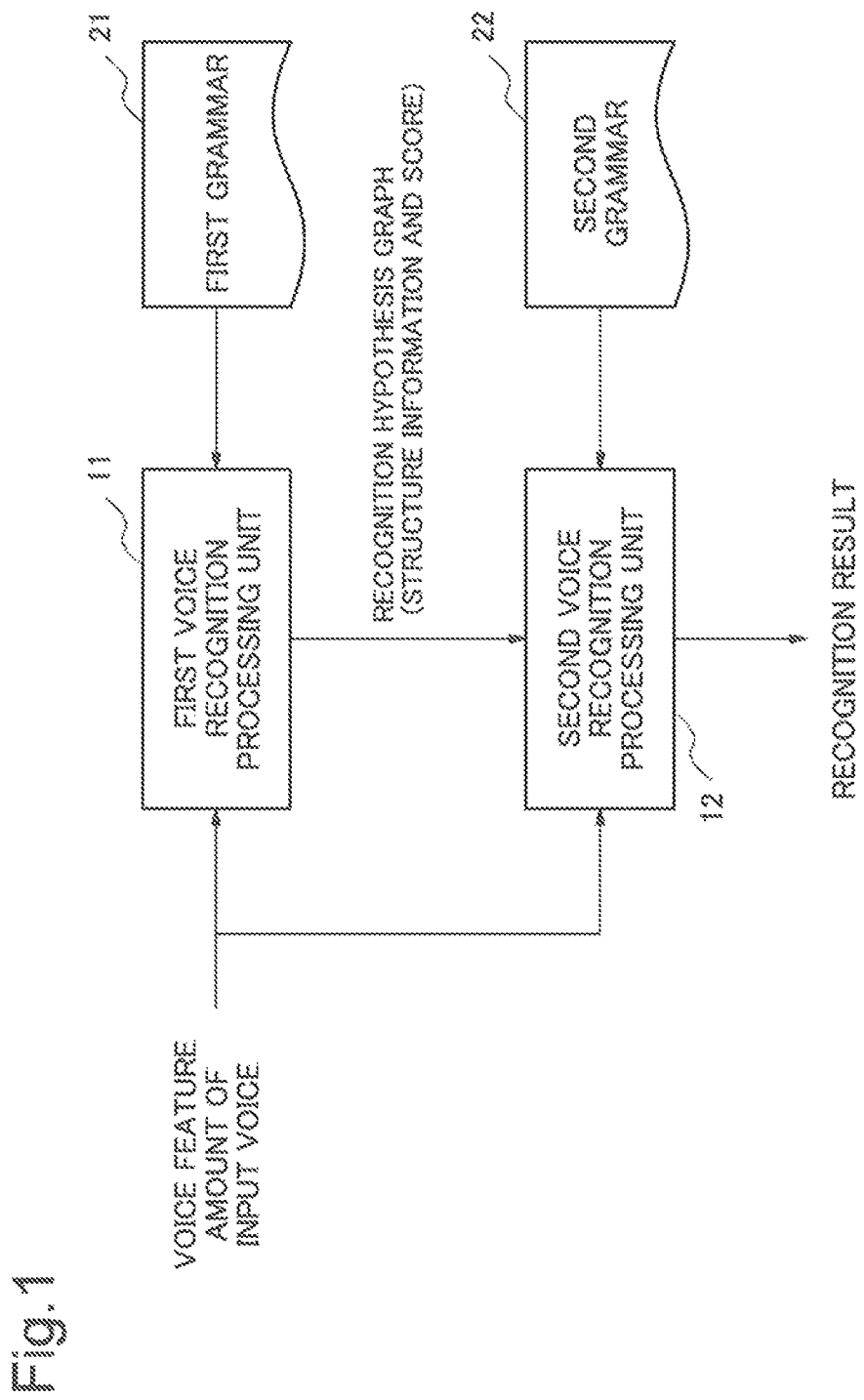
FIG. 1 is a block diagram showing an exemplary configuration of a voice recognition system according to the present invention.
Figure 2:
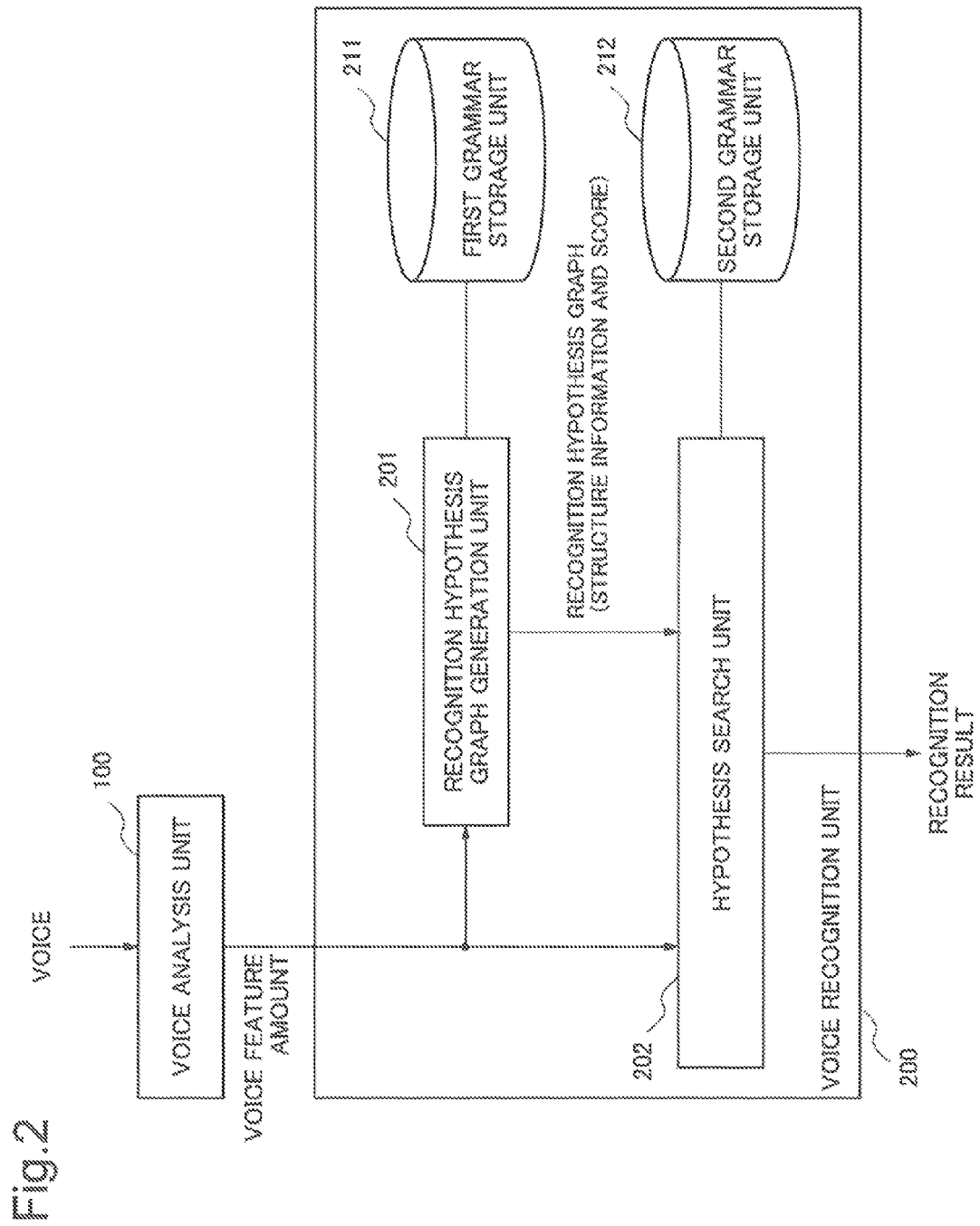
FIG. 2 is a block diagram showing a more concrete exemplary configuration of a voice recognition system according to the present invention.
Figure 3:
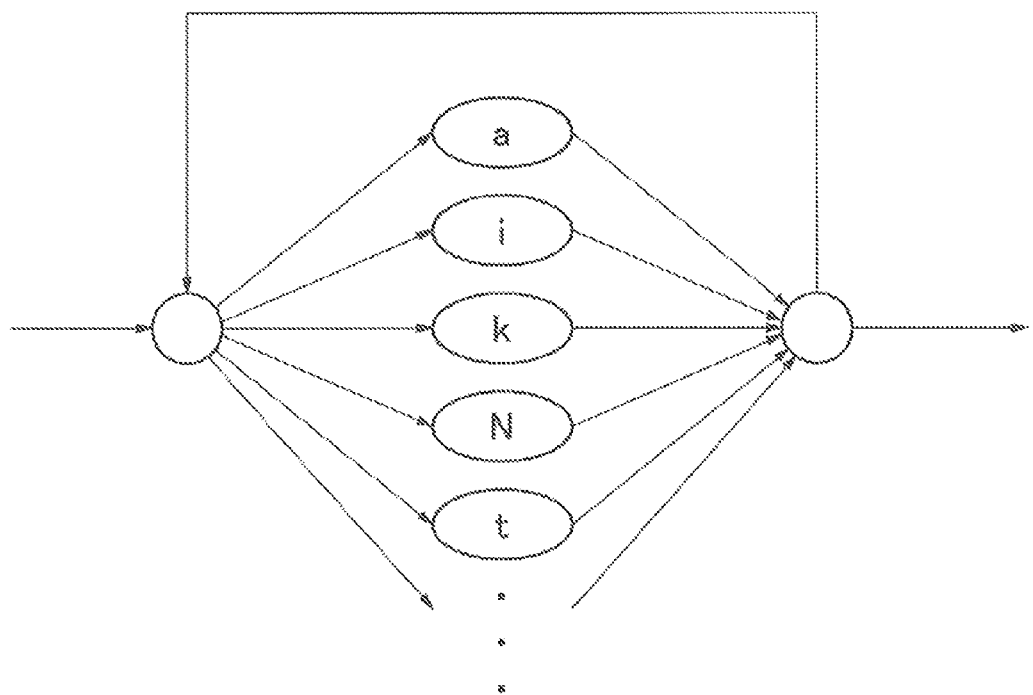
FIG. 3 is an explanation drawing showing an example of definition of a first grammar.
Figure 4:
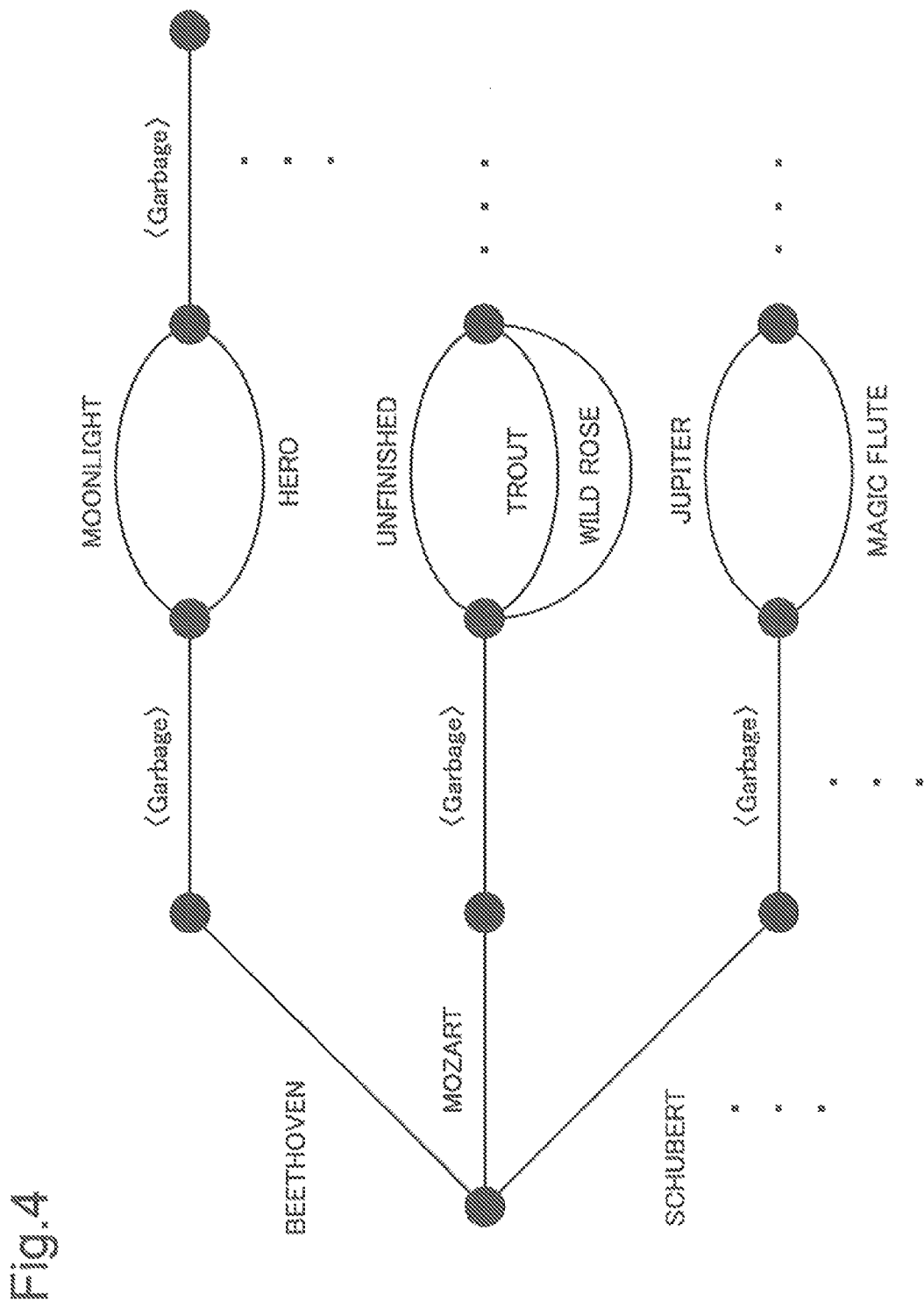
FIG. 4 is an explanation drawing showing an example of definition of a second grammar.
Figure 5:
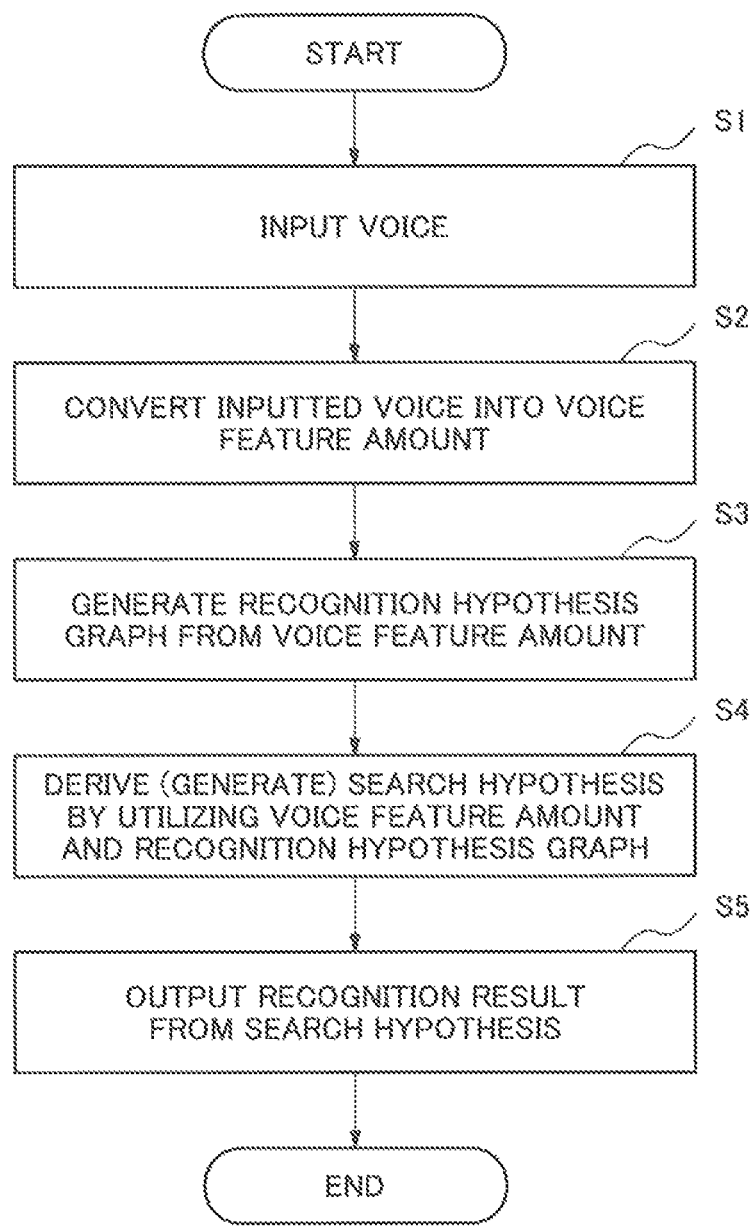
FIG. 5 is a flowchart showing an example of behavior of a voice recognition system.
Figure 6:
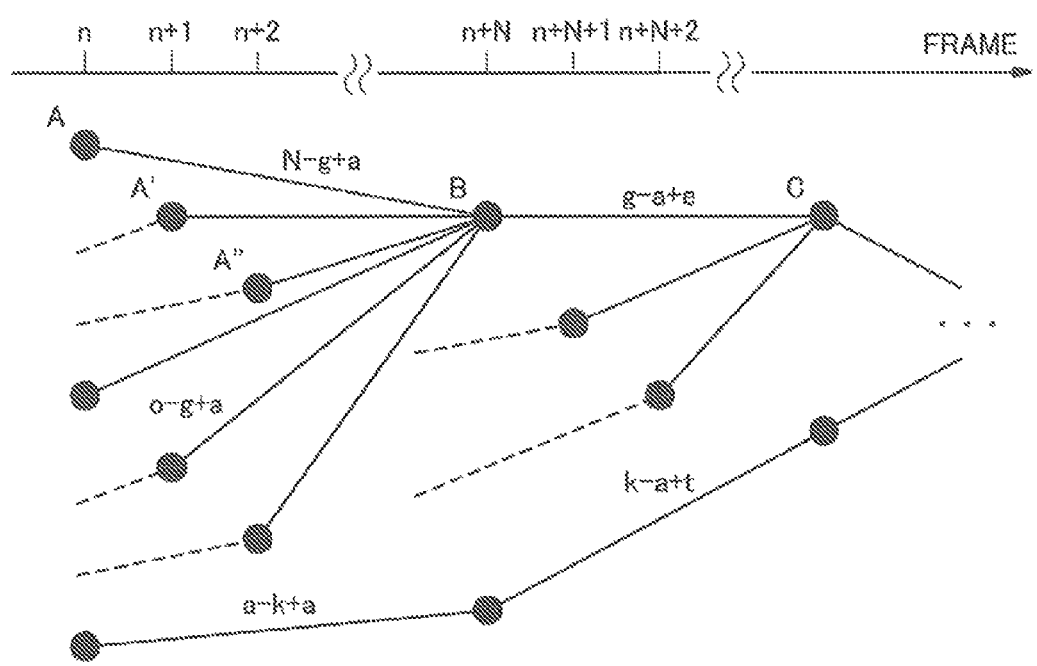
FIG. 6 is an explanation drawing showing an example of a recognition hypothesis graph where unit is triphone.

11 First voice recognition processing unit
12 Second voice recognition processing unit
100 Voice analysis unit
200 Voice recognition unit
201 Recognition hypothesis graph generation unit
202 Hypothesis search unit
211 First grammar storage unit
212 Second grammar storage unit

The invention claimed is:

1. A voice recognition system which recognizes keywords included in input voice, comprising:
a first voice recognition processing means for generating a recognition hypothesis graph which indicates a structure of hypothesis that is derived according to a first grammar together with a score associated with respective connections of a recognition unit by executing a voice recognition process based on said first grammar to a voice feature amount of input voice; and
a second voice recognition processing means for outputting a recognition result from total score of a hypothesis which is derived according to a second grammar after acquiring said structure and said score of said garbage section from said recognition hypothesis graph, and executing a voice recognition process according to said second grammar that is specified to accept a section other than keywords in input voice as a garbage section to a voice feature amount of input voice, wherein
said second voice recognition processing means, to said hypothesis reached to said garbage section in said second grammar, selects no smaller than one voice section having a node which can connected with said hypothesis as a starting point in said recognition hypothesis graph, and connects said structure and said score of a selected voice section with said hypothesis as said structure and said score of said garbage section.

2. The voice recognition system according to claim 1, wherein
using a specified grammar which may accepts one of optional chains of phoneme, phoneme string, syllable string, vocabulary word, and word sequence as said first grammar.

3. The voice recognition system according to claim 1, wherein
said second voice recognition processing means selects said voice section having a node which can be a vocabulary word termination as a ending point in a language of input voice when selecting said voice section which is connected with said hypothesis that reached said garbage section from said recognition hypothesis graph.

4. The voice recognition system according to claim 1, wherein
said first voice recognition processing means executes said voice recognition process in the same direction with time direction of input voice.

5. The voice recognition system according to claim 1, wherein
said first voice recognition processing means executes said voice recognition process in a reverse direction with time direction of input voice.

6. The voice recognition system according to claim 1, wherein
said second voice recognition processing means executes said voice recognition process in a reverse direction with time direction of input voice.

7. The voice recognition system according to claim 1, wherein
said second voice recognition processing means executes said voice recognition process in the same direction with time direction of input voice.

8. A voice recognition method for recognizing keywords included in input voice, comprising:
a first step that generates a recognition hypothesis graph which indicates a structure of hypothesis that is derived according to said first grammar together with a score associated with respective connections of a recognition means by executing a voice recognition process based on said first grammar to a voice feature amount of input voice; and
a second step that outputs a recognition result from a total score of a hypothesis which is derived according to said second grammar after acquiring said structure and said score of said garbage section from said recognition hypothesis graph, and executing said voice recognition process according to said second grammar that is specified to accept a section other than keywords in input voice as said garbage section to said voice feature amount of input voice, wherein
selecting no smaller than one voice section having a node which can connected with said hypothesis as a starting point in said recognition hypothesis graph and connecting said structure and said score of said selected voice section with said hypothesis as said structure and said score of said garbage section, to said hypothesis reached to said garbage section in said second grammar, in said second step.

9. The voice recognition method according to claim 8, wherein
using a specified grammar which may accepts one of optional chains of phoneme, phoneme string, syllable string, vocabulary word, and word sequence as said first grammar.

10. The voice recognition method according to claim 8, wherein
selecting said voice section having a node which can be a vocabulary word termination as a ending point in a language of input voice when selecting said voice section which is connected with said hypothesis that reached said garbage section in said recognition hypothesis graph in said second step.

11. The voice recognition method according to claim 8, wherein
executing said voice recognition process in the same direction with time direction of input voice in said first step.

12. The voice recognition method according to claim 8, wherein
executing said voice recognition process in a reverse direction with time direction of input voice in said first step.

13. The voice recognition method according to claim 8, wherein
executing said voice recognition process in a reverse direction with time direction of input voice in said second step.

14. The voice recognition method according to claim 8, wherein executing said voice recognition process in the same direction with time direction of input voice in said second step.

15. A non-transitory computer readable medium storing a computer program executable within a recognition system and for recognizing keywords included in input voice, the computer program when executed within the recognition system causing the recognition system to perform:
- a first voice recognition process that recognize said input voice according to said first grammar based on said voice feature amount of said input voice; and
- a second voice recognition process that recognize said input voice according to said second grammar based on said voice feature amount of said input voice, wherein
- said first voice recognition process generates said recognition hypothesis graph which indicates said structure of hypothesis that is derived according to said first grammar together with said score associated with respective connections of said recognition means in,
- said second voice recognition process acquires said structure and said score of said garbage section of each hypothesis that is derived according to said second grammar from said recognition hypothesis graph, and
- selects no smaller than one voice section having a node which can connected with said hypothesis as a starting point in said recognition hypothesis graph and connecting said structure and said score of a selected voice section with said hypothesis as said structure and said score of said garbage section to said hypothesis reached to said garbage section in said second grammar.

16. The non-transitory computer readable medium according to claim 15, wherein the computer program when executed within the recognition system is further for causing the recognition system to perform:
- recognizing input voice according to specified first grammar which accepts one of optional chains of phoneme, phoneme string, syllable string, vocabulary word, and word sequence in said first voice recognition process.

17. The computer readable medium according to claim 15, wherein the computer program when executed within the recognition system is further for causing the recognition system to perform:
- selecting a voice section having a node which can be said vocabulary word termination as a ending point in a language of input voice in said recognition hypothesis graph as a voice section which is connected with said hypothesis that reached the garbage section in said second voice recognition process.

* * * * *